United States Patent

Aoyama

(10) Patent No.: US 7,679,778 B2
(45) Date of Patent: Mar. 16, 2010

(54) IMAGE PROCESSING METHOD, IMAGE PROCESSING APPARATUS, AND IMAGE PROCESSING PROGRAM

(75) Inventor: Tatsuya Aoyama, Kanagawa-ken (JP)

(73) Assignee: Fujifilm Corporation, Tokyo (JP)

(\*) Notice: Subject to any disclaimer, the term of this patent is extended or adjusted under 35 U.S.C. 154(b) by 961 days.

(21) Appl. No.: 11/107,921

(22) Filed: Apr. 18, 2005

(65) Prior Publication Data

US 2005/0243349 A1 Nov. 3, 2005

(30) Foreign Application Priority Data

Apr. 19, 2004 (JP) .............................. 2004-122451

(51) Int. Cl.
*H04N 1/407* (2006.01)
*H04N 1/409* (2006.01)

(52) U.S. Cl. .................. 358/1.9; 358/518; 358/520; 358/521; 358/515; 358/523; 358/527; 358/537; 358/3.27; 382/162; 382/167

(58) Field of Classification Search ................ 358/1.9, 358/3.26, 521, 520, 527, 518, 515, 523, 537, 358/3.27; 382/167, 162
See application file for complete search history.

(56) References Cited

U.S. PATENT DOCUMENTS

| | | | |
|---|---|---|---|
| 5,296,945 A | 3/1994 | Nishikawa et al. | |
| 6,535,301 B1 * | 3/2003 | Kuwata et al. | 358/1.9 |
| 7,081,923 B1 * | 7/2006 | Noguchi | 348/256 |
| 7,359,571 B2 | 4/2008 | Terashita et al. | |
| 2002/0118889 A1 | 8/2002 | Shimizu | |

FOREIGN PATENT DOCUMENTS

| | | |
|---|---|---|
| JP | 10-221773 A | 8/1998 |
| JP | 11-191156 A | 7/1999 |
| JP | 2000-261650 A | 9/2000 |
| JP | 2001-101401 A | 4/2001 |
| JP | 2001-103326 A | 4/2001 |
| JP | 2001-169114 A | 6/2001 |
| JP | 2002-204353 A | 7/2002 |
| JP | 2003-244620 A | 8/2003 |

\* cited by examiner

*Primary Examiner*—King Y Poon
*Assistant Examiner*—Quang N Vo
(74) *Attorney, Agent, or Firm*—Birch, Stewart, Kolasch & Birch, LLP

(57) ABSTRACT

Saturation to white and fading of subjects' faces are prevented when performing density correction on digital images. An average signal value, obtained from a photographic image, is compared against a predetermined reference value, to judge whether correction is to be administered to brighten or darken the photographic image. A corrected image constituted by corrected signal values, which are obtained by correcting the pixel signal values of the photographic image with a predetermined correction amount, is generated only in cases that it is judged that correction to brighten the photographic image is to be administered. At this time, if the brightness represented by signal values of pixels of the photographic image are greater than or equal to a predetermined brightness, the correction amount is gradually reduced as the signal values become brighter.

6 Claims, 4 Drawing Sheets

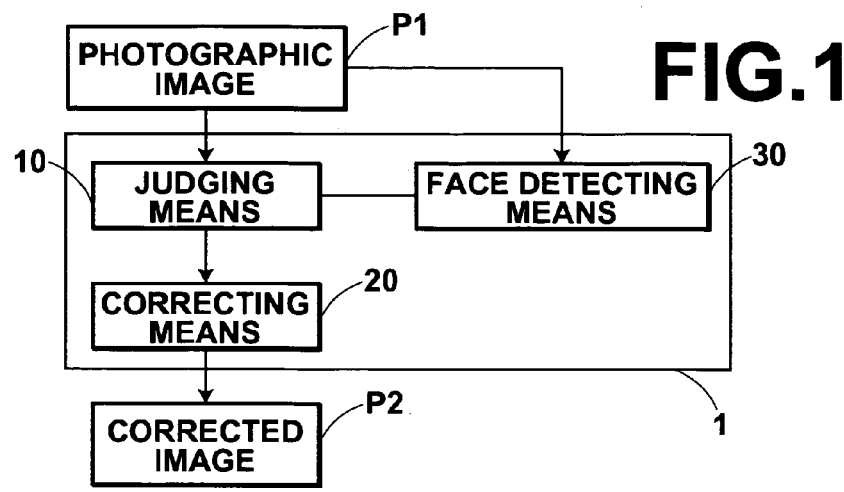
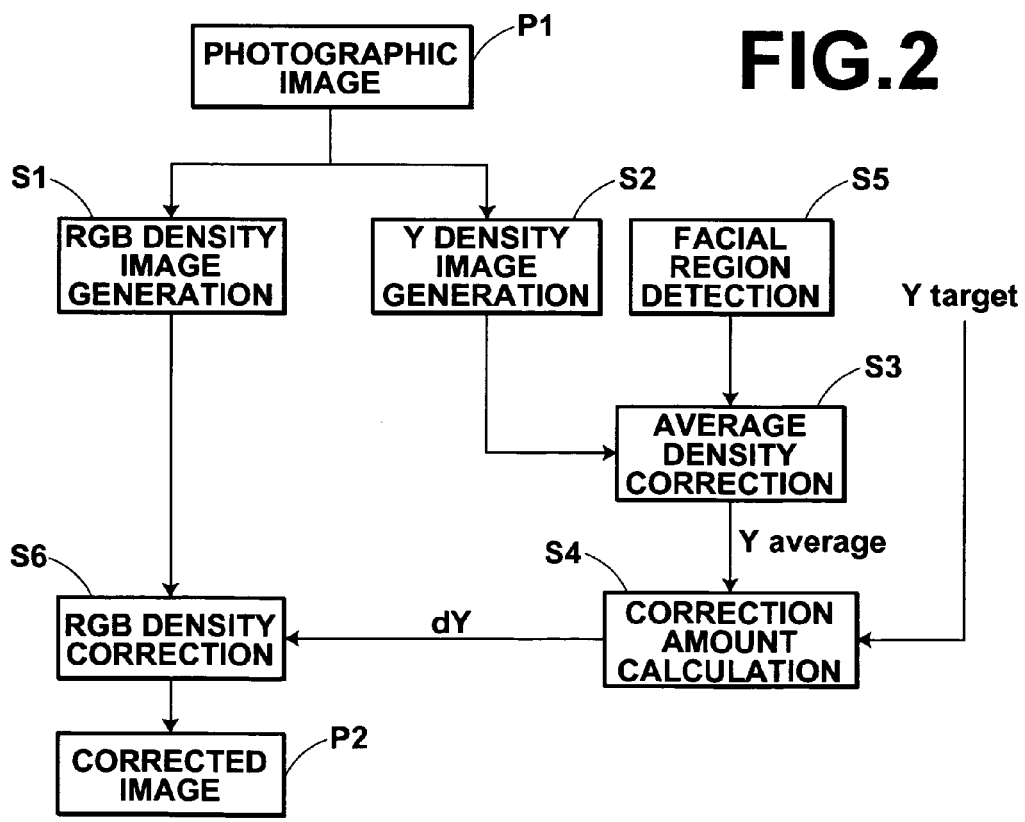

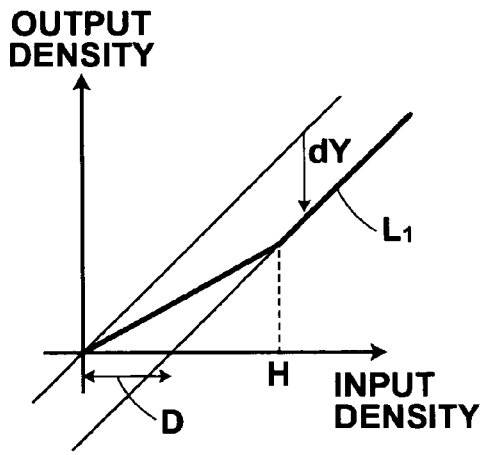
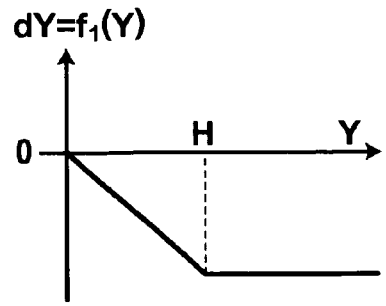
FIG.3A         FIG.3B
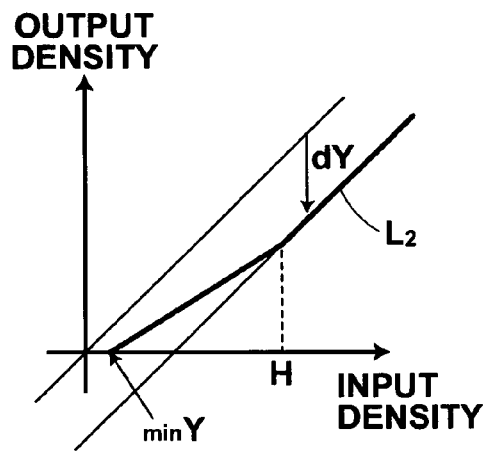
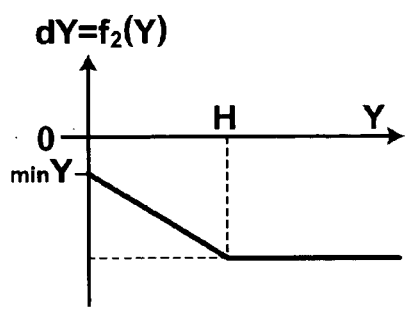
FIG.4A         FIG.4B
| 1 | 1 | 1 |
|---|---|---|
| 0 | 0 | 0 |
| -1 | -1 | -1 |
FIG.5A
| 1 | 0 | -1 |
|---|---|---|
| 1 | 0 | -1 |
| 1 | 0 | -1 |
FIG.5B

IMAGE PROCESSING METHOD, IMAGE PROCESSING APPARATUS, AND IMAGE PROCESSING PROGRAM

BACKGROUND OF THE INVENTION

1. Field of the Invention

The present invention relates to a method, an apparatus, and a program for correcting pixel signal values of digital images obtained by digital still cameras.

2. Description of the Related Art

Conventional image processing apparatuses that generate ID photos to be utilized in ID's, driver's licenses, passports and the like input images of the upper bodies of subjects (people) by photography, and output prints. These image processing apparatuses perform corrections on images, so that even if input conditions vary, prints are generated with consistent qualities. Specifically, a method has been proposed, in which skin colored regions of an image are specified by a mouse or the like, and the skin colors are corrected (as disclosed in, for example, U.S. Pat. No. 5,296,945).

In addition, in image processing apparatuses that generate ID photos, the areas within images that faces are positioned at are within a certain range, because photography is performed while adjusting the heights of chairs that the subjects sit in. Therefore, methods have been proposed in Japanese Unexamined Patent Publication Nos. 10(1998)-221773 and 2000-261650, in which facial areas to be corrected can be automatically extracted, based on data regarding these positions and skin colored pixel areas. In these methods, characteristic values are calculated employing average color densities of the facial areas. Then, correction coefficients are determined, based on an amount of difference between the average color densities of the extracted facial area and an average color density of a facial area within a preset reference image. Finally, image data is corrected employing the correction coefficients.

Each of the above methods is able to obtain favorable correction results in both a brighter direction and a darker direction in cases in which the dynamic ranges of recording media, with which the images are to be reproduced, are wide. However, in image data sets, such as those obtained with digital still cameras and only have an 8 bit memory range, the R, G, and B values can only be represented within a range of 0 to 255. Any data beyond this range is lost. If regions having RGB values that exceed (255, 255, 255) exist within a facial region of an overexposed image, attempts to correct the densities will only yield gray pixels, therefore a favorable image is not always obtainable by correction. Even if the image is not overexposed, there are many cases in which corrections toward a darker direction, administered to images that include faces, result in faded images.

SUMMARY OF THE INVENTION

The present invention has been developed in view of the above circumstances. It is an object of the present invention to provide an image processing method, an image processing apparatus, and an image processing program that perform density correction on digital images obtained by digital still cameras and the like without faces of subjects therein being faded or saturated.

The image processing method of the present invention is an image processing method for correcting an average pixel signal value of a photographic image obtained by photography so that it matches a predetermined reference value, comprising:

a judging step, for judging whether a brightening correction or a darkening correction is to be administered on the photographic image, by comparing the average pixel signal value of the photographic image against the predetermined reference value; and a correcting step, for correcting the photographic image so as to generate a corrected image having corrected pixel signal values, which are the pixel signal values of the photographic image corrected by a predetermined correction amount, only in the case that the judging step judges that a brightening correction is to be administered on the photographic image; wherein:

the correcting step gradually decreases the correction amount for pixel signal values that represent the brightness of pixels, which are greater than or equal to a predetermined brightness, as the brightness of the pixels increases.

The image processing apparatus of the present invention is an image processing apparatus for correcting an average pixel signal value of a photographic image obtained by photography so that it matches a predetermined reference value, comprising:

judging means, for judging whether a brightening correction or a darkening correction is to be administered on the photographic image, by comparing the average pixel signal value of the photographic image against the predetermined reference value; and correcting means, for correcting the photographic image so as to generate a corrected image having corrected pixel signal values, which are the pixel signal values of the photographic image corrected by a predetermined correction amount, only in the case that the judging step judges that a brightening correction is to be administered on the photographic image; wherein:

the correcting means gradually decreases the correction amount for pixel signal values that represent the brightness of pixels, which are greater than or equal to a predetermined brightness, as the brightness of the pixels increases.

The program of the present invention is a program that causes a computer to execute an image processing method for correcting an average pixel signal value of a photographic image obtained by photography so that it matches a predetermined reference value, comprising:

a judging procedure, for judging whether a brightening correction or a darkening correction is to be administered on the photographic image, by comparing the average pixel signal value of the photographic image against the predetermined reference value; and a correcting procedure, for correcting the photographic image so as to generate a corrected image having corrected pixel signal values, which are the pixel signal values of the photographic image corrected by a predetermined correction amount, only in the case that the judging step judges that a brightening correction is to be administered on the photographic image; wherein:

the correcting procedure gradually decreases the correction amount for pixel signal values that represent the brightness of pixels, which are greater than or equal to a predetermined brightness, as the brightness of the pixels increases.

The "average pixel signal value of a photographic image" may be the average pixel signal value of the entire photographic image. Alternatively, the "average pixel value of a photographic image" may be the average pixel value of a portion of the photographic image.

The "pixel signal value" refers to brightness density, RGB density, a linear brightness value representing the amount of luminous flux, an RGB value, and the like.

It is desirable that the correcting step performs correction such that the corrected pixel signal values are not saturated in a direction of brightness.

The photographic image may be an image that includes a facial region.

It is desirable that the average pixel signal value obtained from the photographic image is an average pixel signal value of the facial region.

It is also desirable that the correction amount is set to zero for pixels having pixel signal values brighter than the pixel signal value of the brightest pixel within the facial region within the photographic image.

According to the present invention, the average pixel signal value of the photographic image is compared against the reference value. Correction is performed on the photographic image only in a brighter direction. The correction amount is gradually decreased when a pixel signal value is greater than or equal to a predetermined brightness, and correction is performed such that the corrected pixel signal values do not become saturated in the direction of brightness. Thereby, faces will not be saturated to white, and photographic images may be corrected to have appropriate pixel signal values. In addition, low density regions, such as faces, do not become faded by the correction.

In addition, if the average pixel signal value is the average pixel signal value of a facial region included in the photographic image, the facial density may be corrected to be in a uniform state.

Further, if correction is performed with the brightest pixel signal value within the facial region of the photographic image, the facial regions will not become saturated to white.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

BRIEF DESCRIPTION OF THE DRAWINGS

FIG. 1 is a schematic diagram illustrating the construction of a image processing apparatus of the present invention.

FIG. 2 is a diagram for explaining the processing operations of the image processing apparatus.

FIGS. 3A and 3B illustrate softening of tones of density values (part 1).

FIGS. 4A and 4B illustrate softening of tones of density values (part 2).

FIGS. 5A and 5B illustrate examples of edge detecting filters.

DESCRIPTION OF THE PREFERRED EMBODIMENTS

Figure 6:
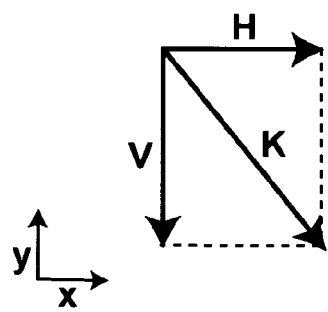
FIG. 6 is a diagram for explaining gradient vectors.

Hereinafter, an embodiment of an image processing apparatus 1 that executes the image processing method of the present invention will be described with reference to the attached drawings.

The image processing apparatus 1 of the present invention comprises: a judging means 10; and a correcting means 20, as illustrated in FIG. 1. The judging means 10 judges whether a photographic image P1 is to be corrected to become brighter or to become darker. The correcting means 20 generates a corrected image P2, in which pixel signal values are close to a reference value, only in cases that the judging means 10 judges that the photographic image P1 is to be corrected to become brighter. Further, the image processing apparatus 1 comprises a facial region detecting means 30, for detecting facial regions from within the photographic image P1.

The photographic image P1 is a digital image data set, which has been obtained by photography with a digital still camera or the like.

The judging means 10 compares the average pixel signal value of the photographic image P1 against a predetermined reference value. The judging means 10 performs this comparison to judge whether the photographic image P1 is to be corrected to become brighter or darker when the photographic image P1 is corrected to approximate the reference value.

The correcting means 20 generates the corrected image P2, which has corrected signal values X. The corrected signal values X are obtained by correcting the signal values Y of each pixel of the photographic image P1 with a correction amount dY, so that the average pixel signal value of the photographic image P1 approximates the reference value.

The face detecting means 30 detects regions that are likely to be faces from the photographic image P1. The face detection method is not particularly limited. As specific examples, face detection by extracting skin colored circular shapes; face detection by extracting facial contours/circular shapes; face detection by extracting bodies/circular shapes; face detection by extracting eyes (facial structural components) /circular shapes; face detection by extracting circular shapes; and face detection by extracting hair portions/circular shapes may be listed (for details, refer to Japanese Unexamined Patent Publication No. 8(1996)-184925).

The processing operations, during the correction of the pixel signal values of the photographic image P1 by the image processing apparatus 1, will be described with reference to FIG. 2. The description will be given for a case in which the pixel signal values are brightness densities, and the correction is performed with the brightness density as a reference.

Correction of the photographic image P1 is performed by calculating an average pixel signal value of the photographic image P1, then correcting the photographic image P1 such that the average pixel signal value approximates a reference average pixel signal value of a standard image. However, digital image data sets can only bear pixel data within a predetermined bit width (8 bits, for example). Therefore, during quantization, pixel values of pixels which are brighter than a predetermined brightness within regions, such as overexposed faces, become (255, 255, 255). Any data that exceeds these values becomes lost. For this reason, if the pixel values are corrected to become darker, overexposed facial regions become gray, therefore not yielding favorable results. Accordingly, in cases that the photographic image PI is corrected to approximate the reference value, correction is performed only to brighten the image. That is, correction that causes the image to become darker is not performed.

First, the judging means 10 judges whether the photographic image P1 is to be changed to become darker or brighter.

First, an RGB density image and a Y density image, based on brightness values Y, are generated from the original photographic image P1 (S1 and S2). The conversion formulas for converting RGB values to YCrCb values are:

$$Y = 0.299R + 0.587G + 0.114B \quad (1)$$

$$Cr = 0.500R - 0.419G - 0.081B \quad (2)$$

$$Cb = -0.169R - 0.332G + 0.500B \quad (3)$$

Then, the densities Y of the photographic image P1 are calculated, and an average density value $Y_{average}$ is calculated for the photographic image P1 (S3). In order to perform only correction to brighten the image and not to darken the image, correction is performed in the case that $Y_{average} > Y_{target}$, and not performed in the case that $Y_{average} < Y_{target}$.

The correcting means 20 performs correction only in cases that $Y_{average} > Y_{target}$. The correcting means 20 obtains corrected density values X by subtracting a correction amount dY from density values Y of each of the pixels of the photographic image P1, according to the formula:

$$X = Y - dY \quad (4)$$

The correction amount dY may alternatively be determined based on the reference value $Y_{target}$ and the average density value $Y_{average}$ according to the formula:

$$dY = Y_{target} - Y_{average} \quad (5)$$

In order to perform corrections so that densities of facial regions of subjects within images become constant, the average density value of a facial region detected by the face detecting means 30 may be employed as the average density value $Y_{average}$ in the above formula.

However, if correction is performed to uniformly brighten an image, low density portions (for example, the portion denoted by D in FIG. 3A) will assume negative density values. Therefore, these portions are treated as though their density values are zero. For this reason, low density portions may be saturated to white.

Accordingly, tones are softened at low density portions having density values H (>dY) or less, that is, the correction amount dY is gradually decreased such that the corrected density values X do not become zero or less. For example, if the correction amount dY is determined as $dY = f_1(Y)$ as illustrated in FIG. 3B such that there are no regions that will be saturated to white, then the relationship between the input densities (photographic image P1) and the output densities (corrected image P2) become that represented by curve $L_1$ in the graph of FIG. 3A. Alternatively, a facial region maybe detected by the face detecting means 30 (to be described later), and the correction amount dY may be set such that the facial region does not become saturated to white, using the pixels within the detected facial region as references. That is, if the correction amount dY is determined as $dY = f2(Y)$ as illustrated in FIG. 4B, then the relationship between the input densities (photographic image P1) and the output densities (corrected image P2) become that represented by curve $L_2$ in the graph of FIG. 4A.

In the case that the face detecting means 30 performs face detection by extracting skin colored circular shapes, a face is detected by extracting skin colored regions and circular shapes from the photographic image P1 (S5). That is, the hue and chroma of each pixel within the photographic image P1 are detected, to extract pixel regions (skin colored regions) which can be estimated to be the color of human skin. Next, circular (oval) shapes are extracted from the extracted skin colored regions, because human faces are generally oval in shape. The extracted oval skin colored regions are estimated to be human faces, and designated as facial region candidates. Alternatively, various component extraction methods, such as those disclosed in Japanese Unexamined Patent Publication Nos. 8(1996)-122944, 9(1997)-80652, 9(1997)-101579, 9(1997)-138470, 9(1997)-138471 and the like are applicable.

Further, discriminators, which have performed learning employing a plurality of sample images, which are known to be of faces, and a plurality of sample images, which are known not to be of faces, are employed to judge whether the regions extracted as facial region candidates are true facial regions.

Figure 7A:
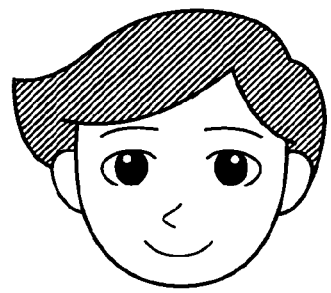
FIGS. 7A and 7B illustrate the directions of gradient vectors on an image of a human face.
Figure 7B:
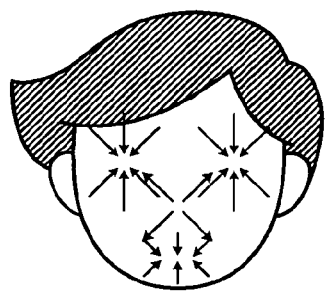

For example, a filtering process is administered on a facial region within the photographic image P1, employing the horizontal edge detecting filter illustrated in FIG. 5A, to detect edges in the horizontal direction. Then, a filtering process is administered on the facial region within the photographic image P1, employing the vertical edge detecting filter illustrated in FIG. 5B, to detect edges in the vertical direction. Thereafter, gradient vectors K are calculated for each pixel, from the size of the horizontal edge H and the size of the vertical edge V of each pixel within the photographic image, as illustrated in FIG. 6. In the case that an image is of a human face, such as that illustrated in FIG. 7A, the gradient vectors K calculated in this manner point toward the centers of eyes and mouths, which are dark portions of the image, as illustrated in FIG. 7B. Conversely, the gradient vectors K point toward the exteriors of bright portions, such as noses. Note that because density changes are greater at the eyes than at mouths, the magnitudes of the gradient vectors K are greater at the eyes than at the mouths.

Figure 8:
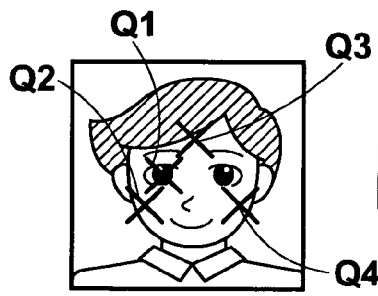
FIG. 8 illustrates examples of characteristic positions within a face.

The positions of eyes, cheeks, and foreheads within sample images, which are known to be of faces, are substantially fixed according to the size of the face, and there are little individual differences. Therefore, the center positions of a right eye and a left eye are detected from the gradient vectors, as illustrated in FIG. 7B. The center positions of the right eye and the left eye are employed as references to set positions Q1, Q2, Q3, and Q4, as illustrated in FIG. 8. Position Q1 corresponds to the center of the right eye, position Q2 corresponds to the right cheek, position Q3 corresponds to the forehead, and position Q4 corresponds to the left cheek. Thereafter, gradient vectors K are obtained at each of the positions. Learning of the sample images, which are known to be of faces, and the sample images, which are known not to be of faces, is performed by the discriminators, based on characteristic amounts obtained from the gradient vectors K (the directions and magnitudes of the gradient vectors K, for example).

The discriminators are structured so as to judge that images from which positive values are obtained have high probabilities of being faces, and that images from which negative values are obtained have low probabilities of being faces, for example. In this case, images from which high values are obtained are judged to be facial regions.

Figure 9:
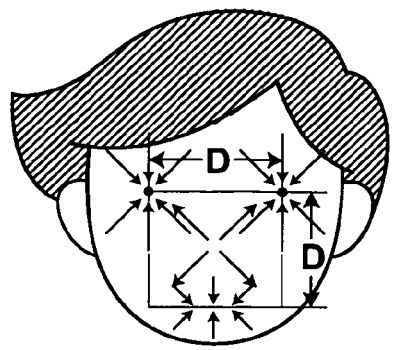
FIG. 9 illustrates an example of a region, from which an average density value of a facial region is calculated.

The center positions of the right eye and the left eye are detected based on the density gradients, as described above, from within the facial region detected by the face detecting means 30. Then, the average density values and a minimum density value $Y_{min}$ of the pixels within the facial region are calculated within a square having a distance D between the centers of the eyes as a length of a side, as illustrated in FIG. 9.

The reverse conversion formulas for converting YCrCb values back to RGB values are:

$$R = Y + 1.402Cr \quad (6)$$

$$G = Y - 0.714Cr - 0.344Cb \quad (7)$$

$$B = Y + 1.772Cb. \quad (8)$$

Accordingly, in the case that the density values Y of the photographic image P1 are brightened by the correction amount dY, the RGB values of the corrected image P2 (R', G', B') are represented by:

$$R' = R + f(Y) \quad (9)$$

$$G' = G + f(Y) \quad (10)$$

$$B' = B + f(Y) \quad (11)$$

wherein f( ): $f_1$( ) or $f_2$( )

Figure 11:
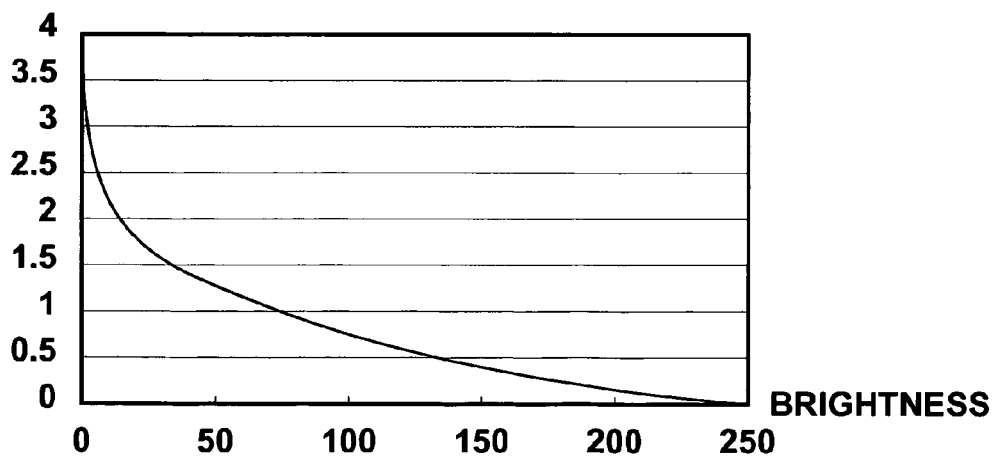
FIG. 11 is a graph illustrating an optical density curve.

The relationship between brightness and optical density is represented by the optical density curve illustrated in the graph of FIG. 11. In cases that ID photos that picture humans therein are to be corrected, it is desirable that density values are corrected to be within a range of 0.4 to 0.5. These preferred density values are based on experience. In addition, favorable results can be obtained by setting the density values H of the low density regions, of which the tone is to be softened, within a range of 0.7 to 1.0 in optical density.

A case in which correction is performed using brightness density as a reference has been described above. However, similar corrections may be performed with regard to each of the densities of RGB. For example, correction amounts for the RGB values may be calculated, based on each of the average pixel signal values regarding the R value, the G value, and the B value and target values therefore, by employing Formula (5). Note that the correction amount of the RGB values are decreased at regions having densities less than or equal to a predetermined density value, in a similar manner to that as illustrated in FIG. 3B or FIG. 4B. The corrected densities (R', G', B') may be obtained according to the following formulas:

$$R' = R + f(R) \quad (12)$$

$$G' = G + f(G) \quad (13)$$

$$B' = B + f(B) \quad (14)$$

wherein f( ): $f_1$( ) or $f_2$( )

Note that the densities of the R values are low within facial regions. Therefore, a minimum R density value $R_{min}$ may be derived within the facial region, and correction may be performed such that R values are greater than or equal to the minimum R density value $R_{min}$. If correction is performed in this manner, saturation within the facial region becomes less likely to occur.

Further, a case in which correction is performed along an 8 bit density axis has been described above. Alternatively, correction may be performed on an a linear luminous flux signal axis. Specifically, normal 8 bit brightness density values $Y_{8\,bit}$ are converted to luminous flux linear brightness signal values $Y_{linear}$ according to the formula:

$$Y_{linear} = \{(Y_{8\,bit}/255 + 0.055)/1.055\}^{1/0.45} \quad (15)$$

Then, the luminous flux linear brightness signal values $Y_{linear}$ are converted to brightness density values $Y_{density}$ according to the formula:

$$Y_{density} = -\log 10(Y_{linear}) \quad (16)$$

In this case, a correction amount $dY_{linear}$ for the luminous flux linear brightness signal values is calculated from a reference value $Y_{target}$ and an average signal value $Y_{average}$, according to the formula:

$$dY_{linear} = Y_{target}/Y_{average} \quad (17)$$

The corrected luminous flux linear brightness values $X_{linear}$ are calculated according to the formula:

$$X_{linear} = Y_{linear} \cdot dY_{linear} \quad (18)$$

Figure 10A:
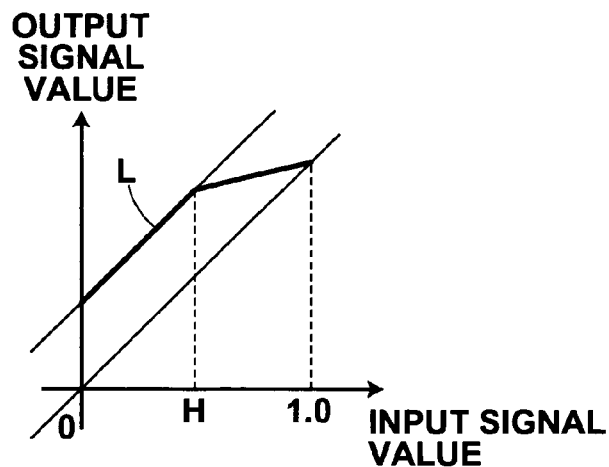
FIGS. 10A and 10B illustrate softening of tones of signal values.
Figure 10B:
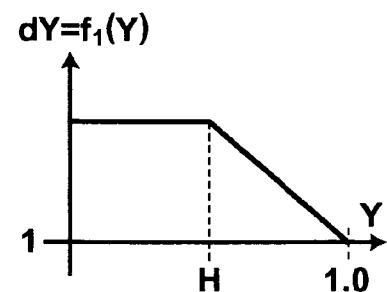

Note that tones may be softened at portions of the image having signal values less than or equal to a predetermined signal value H, as illustrated in FIG. 10B. In this case, the relationship between input signals (photographic image P1) and output signals (corrected image P2) become that represented by curve L of the graph of FIG. 10A.

The above formulas (15) through (18) are applicable to RGB values as well. RGB densities may be corrected with luminous flux linear RGB signals.

The image processing apparatus may be constituted by recording a program that enables execution of the functions of the image processing apparatus described above in a recording medium, then installing the program on a computer, such as a personal computer or a workstation. Alternatively, the program may be downloaded via a network and installed in computers.

As described in detail above, it is possible to perform corrections on digital images without any regions being saturated to white, by softening tones at low density portions, which appear often in human faces.

What is claimed is:

1. An image processing method for correcting an average brightness density value of a photographic image that includes a facial region obtained by photography so that it matches a predetermined reference value, comprising:
    a facial region detecting step, for detecting, using a processor, the facial region from within the photographic image;
    a judging step, for judging, using a processor, whether a brightening correction or a darkening correction is to be administered on the photographic image, by comparing the average brightness density value of the photographic image against the predetermined reference value; and
    a correcting step, for correcting, using a processor, the photographic image so as to generate a corrected image having corrected pixel signal values, which are the pixel signal values of the photographic image corrected by a predetermined correction amount, only in the case that the judging step judges that a brightening correction is to be administered on the photographic image; wherein:
    the judging step obtains the average pixel signal value from within the facial region which is detected within the photographic image,
    the correcting step gradually decreases the correction amount for pixel signal values that represent the brightness of pixels, which are greater than or equal to a predetermined brightness, as the brightness of the pixels increases, and
    the correcting step performs correction such that the corrected pixel signal values are not saturated in a direction of brightness.

2. An image processing method as defined in claim 1, wherein:
the correction amount is set to zero for pixels having pixel signal values brighter than the pixel signal value of the brightest pixel within the facial region within the photographic image.

3. An image processing apparatus for correcting an average brightness density value of a photographic image that includes a facial region obtained by photography so that it matches a predetermined reference value, comprising:
detecting means for detecting the facial region from within the photographic image;
judging means, for judging whether a brightening correction or a darkening correction is to be administered on the photographic image, by comparing the average brightness density value of the photographic image against the predetermined reference value; and
correcting means, for correcting the photographic image so as to generate a corrected image having corrected pixel signal values, which are the pixel signal values of the photographic image corrected by a predetermined correction amount, only in the case that the judging step judges that a brightening correction is to be administered on the photographic image; wherein:
the judging means obtains the average pixel signal value from within the detected facial region;
the correcting means gradually decreases the correction amount for pixel signal values that represent the brightness of pixels, which are greater than or equal to a predetermined brightness, as the brightness of the pixels increases such that the corrected pixel signal values are not saturated in a direction of brightness.

4. A computer readable medium having stored thereon a program that causes a computer to execute an image processing method for correcting an average brightness density value of a photographic image that includes a facial region obtained by photography so that it matches a predetermined reference value, comprising:
a detecting procedure, for detecting the facial region from within the photographic image;
a judging procedure, for judging whether a brightening correction or a darkening correction is to be administered on the photographic image, by comparing the average brightness density value of the photographic image against the predetermined reference value; and
a correcting procedure, for correcting the photographic image so as to generate a corrected image having corrected pixel signal values, which are the pixel signal values of the photographic image corrected by a predetermined correction amount, only in the case that the judging step judges that a brightening correction is to be administered on the photographic image; wherein:
the judging procedure obtains the average pixel signal value from within the detected facial region;
the correcting procedure gradually decreases the correction amount for pixel signal values that represent the brightness of pixels, which are greater than or equal to a predetermined brightness, as the brightness of the pixels increases such that the corrected pixel signal values are not saturated in a direction of brightness.

5. An image processing method for correcting a brightness density of a photographic image having a facial region, comprising:
receiving pixel signal values representing the photographic image;
detecting, using a processor, the facial region from within the photographic image;
calculating pixel signal brightness density values Y for each pixel signal value in the detected facial region;
calculating, using a processor, an average brightness density value $Y_{average}$ for the detected facial region;
comparing, using a processor, the average brightness density value $Y_{average}$ against a predetermined reference density value $Y_{target}$;
determining, using a processor, whether a brightening correction or a darkening correction is to be administered on the photographic image, based on said comparison; and
only if it is determined that a brightening correction is to be administered on the photographic image, then correcting the photographic image by correcting the pixel signal brightness density values by a predetermined correction amount,
wherein the predetermined correction amount gradually decreases as the pixel signal brightness density value increases, for pixel signal brightness density values which are greater than or equal to a predetermined brightness such that the corrected pixel signal values are not saturated in a direction of brightness.

6. An image processing method as defined in claim 2, wherein the facial region is detected using a discriminator that discriminates the facial region, the discriminator being generated by performing learning using a plurality of sample images, which are known to be of faces, and sample images, which are known not to be of faces.

* * * * *